A. R. McCAUSLAND.
SPEED CHANGING MECHANISM.
APPLICATION FILED MAY 19, 1909.

1,007,959.

Patented Nov. 7, 1911.

WITNESSES.

INVENTOR.

UNITED STATES PATENT OFFICE.

ARTHUR R. McCAUSLAND, OF WASHINGTON, PENNSYLVANIA.

SPEED-CHANGING MECHANISM.

1,007,959.  Specification of Letters Patent.  Patented Nov. 7, 1911.

Application filed May 19, 1909. Serial No. 497,115.

*To all whom it may concern:*

Be it known that I, ARTHUR R. MCCAUSLAND, a resident of Washington, in the county of Washington and State of Pennsylvania, have invented a new and useful Improvement in Speed-Changing Mechanism; and I do hereby declare the following to be a full, clear, and exact description thereof.

My invention relates to speed changing mechanism in general, and particularly speed reversing mechanism for use in connection with reciprocating engines. Its object is to provide a mechanism of this character which will be simple and compact in structure, and can be conveniently used in connection with oil well and like machinery where complicated devices are undesirable and where the reversing mechanism proper is often unused for considerable periods of time.

To these ends my invention consists, generally stated, in two connecting rods both pivotally connected to a reciprocating driving member such as the piston of a suitable engine cylinder, shafts driven by said rods respectively, a driven wheel loosely journaled on one of said shafts and a gear wheel loosely journaled on the other, clutches arranged on each of said shafts to connect the wheels thereto, and thereby reversing the motion of the driven load as desired, there being preferably a fly wheel mounted on one or both of said shafts. By my invention I provide a simple mechanism for reversing the direction of the driven machinery, which may be connected to the driven wheel of the reversing mechanism by any suitable means, such as a belt, and for maintaining the momentum of the driven load during the reversal while employing a single engine cylinder in connection with the reversing mechanism.

Figure 1:
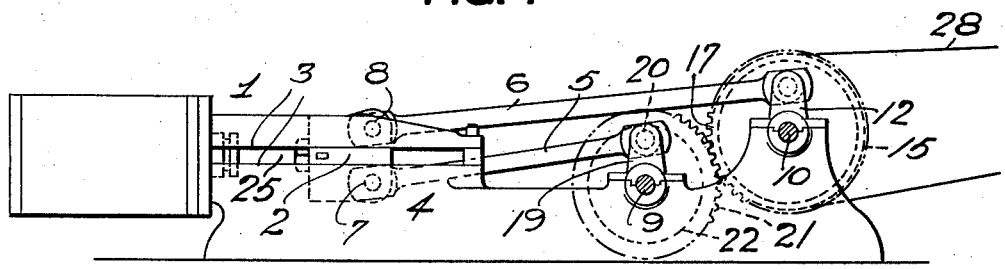
Figure 2:
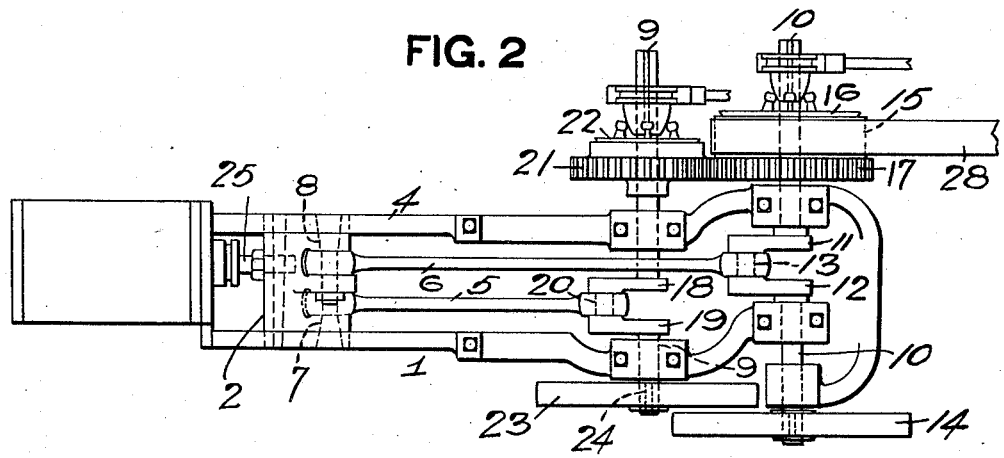

In the drawings Figure 1 is a side view of the preferred form of my invention; Fig. 2 is a plan view of the embodiment illustrated in Fig. 1; and Fig. 3 is a plan view of an alternative construction in which the auxiliary fly wheel illustrated in Fig. 1 is dispensed with.

Any suitable engine is represented in the drawings by the numeral 1. It has the cross-head 2 traveling in the cross-head guides 3. These cross-head guides are preferably of extended construction so that the part 4 of the engine frame partly includes the two connecting rods 5, 6 which are pivoted to the cross-head by the wrist pins 7 and 8 respectively. The engine frame 4 supports the rotary shafts 9 and 10, the rotary shaft 9 being pivotally journaled therein at a lower level than the shaft 10, as shown clearly in Fig. 1. The shaft 10 is conveniently constructed with the integral crank arms 11 and 12 connected by the wrist pin 13 to which the connecting rod 6 is pivoted. On one end of this shaft 10 the regular flywheel 14 is carried, and on the other end the belt-wheel 15 is rotatably mounted. The clutch 16, illustrated diagrammatically as a friction clutch, is mounted on the shaft 10 and is adapted to fix the belt wheel 15 thereto. A gear wheel illustrated as preferably the gear face 17, is fixed to the belt wheel 15. The shaft 9 has likewise the crank arms 18 and 19 connected by the wrist pin 20 around which the connecting rod 5 is pivoted. These crank arms 18 and 19 are so constructed and the two shafts 9 and 10 are so relatively journaled that the mechanism may be conveniently set up in a compact space without causing any interference between the respective rods and shafts. The shaft 9 has rotatably mounted on one end the reversing gear wheel 21, and the clutch 22 illustrated as a friction clutch adapted to fix the gear wheel 21 to the shaft. This gear wheel may be removed, as may the connecting rod 5, where, for any reason, it is not desired to use the reversing mechanism proper for a period of time. I also prefer to provide the fly wheel 23 which is keyed to the other end of the shaft 9 at 24.

Figure 3:
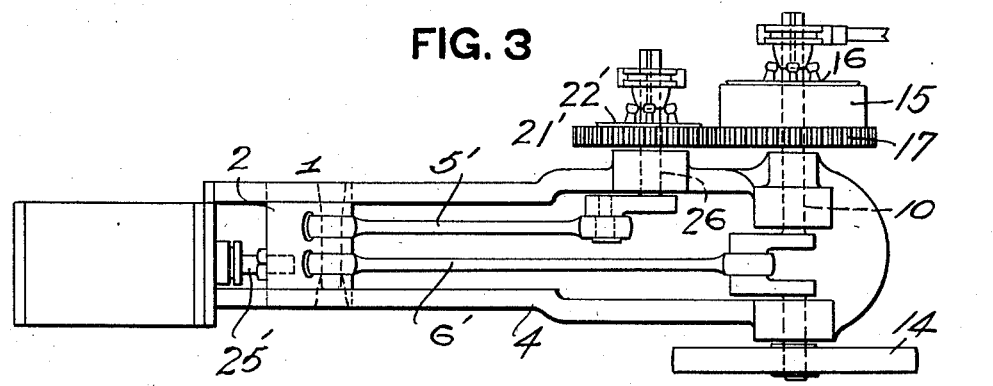

In both embodiments of my invention illustrated the piston rods 25 and 25' respectively are situated substantially in line with the main connecting rod 6 or 6', as shown in Figs. 2 and 3. By this arrangement the stroke of the piston is taken without great side thrust by the main connecting rod, which is employed during the greater part of the operation and especially when the greatest load is on the engine.

Fig. 3 illustrates an embodiment nearly like that of Fig. 2, the connecting rod 5', however, being connected to a short shaft 26 which carries the gear wheel 21' and clutch 22' similar to the gear wheel 21 and clutch 22 respectively, but has no fly wheel corresponding to the fly wheel 23. While I do not regard the auxiliary fly wheel 23 as being absolutely essential to the operation of my invention in its broadest form, I prefer to employ it to insure the effective working of the device.

In ordinary operation the clutch 16 is set and the belt wheel 15 is driven forwardly by the shaft 10. The driven machinery, not shown, is conveniently driven, for instance, by the belt 28. The clutch 22 being open, the gear wheel 21, which is in mesh with the gear face 17, will rotate idly about the shaft 9. To reverse the device the clutch 16 is disconnected and the clutch 22 is set, which operations can be conveniently performed by one continuous movement of any suitable lever device, not illustrated, as is well understood in the art. The gear wheel 21 will now be driven forwardly by the shaft 9, and the gear face 17 and belt wheel 15 rotated backwardly. It will be noticed that the connecting rods 5 and 6 are both in continuous movement during the operation of the mechanism, the gear wheel 21 revolving idly about the shaft 9 during forward motion. The fly wheel 23, if employed, aids greatly in insuring effective reverse motion when the clutch 22 is set as it is already in rotation and therefore acts as a means for transmitting energy already stored. The regular fly wheel 14 is not stopped in any manner by the reversing operation, however, and the kinetic energy stored by it is immediately and continuously available to enable the engine to start the reverse motion of the driven machinery.

What I claim is:

1. In speed changing mechanism a reciprocating driving member, two connecting rods connected thereto, two shafts driven respectively by said rods, a driven wheel loosely journaled on one of said shafts, a wheel loosely journaled on the other of said shafts, a connection between said wheels for driving said driven wheel from the other wheel when desired, and clutching means adapted to fix each of said wheels to its shaft respectively.

2. In speed changing mechanism a reciprocating driving member, two rotary shafts, separate driving connections between each of said shafts and said driving member, a driven gear wheel provided with suitable driving connections journaled on one of said shafts and a clutch adapted to fix it thereto, a reversing gear wheel journaled on the other shaft in mesh with said driven gear wheel, and a clutch adapted to fix said reversing gear wheel to its shaft.

3. In speed changing mechanism a reciprocating driving member, two connecting rods both connected thereto, a rotary shaft, a fly wheel thereon and a gear wheel loosely journaled thereon, a second rotary shaft, a gear wheel loosely journaled thereon, said gear wheels being in mesh and said shafts being respectively driven by said connecting rods, and clutching means mounted on said shafts to connect said gear wheels thereto respectively.

4. In speed changing mechanism in combination with a single driving member, two connecting rods each connected thereto, two shafts driven respectively by said connecting rods, fly-wheels operatively connected thereto, respectively, a driven gear wheel journaled on one of said shafts, a clutch adapted to fix it thereto and a reversing gear wheel journaled on the other shaft in mesh with said driven gear wheel, and a clutch adapted to fix it to said shaft, and thereby reverse the motion of the driven gear wheel when its clutch is opened.

In testimony whereof, I, the said ARTHUR R. McCAUSLAND have hereunto set my hand.

ARTHUR R. McCAUSLAND.

Witnesses:
J. C. BRYANT,
J. M. PRIGG.

---

Copies of this patent may be obtained for five cents each, by addressing the "Commissioner of Patents, Washington, D. C."